(12) United States Patent
Namie et al.

(10) Patent No.: US 11,754,992 B2
(45) Date of Patent: Sep. 12, 2023

(54) CONTROL DEVICE AND CONTROL PROGRAM

(71) Applicant: OMRON Corporation, Kyoto (JP)

(72) Inventors: Masaki Namie, Takatsuki (JP); Yukio Iname, Kyoto (JP); Yoshimasa Usui, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 212 days.

(21) Appl. No.: 17/424,609

(22) PCT Filed: Jan. 23, 2020

(86) PCT No.: PCT/JP2020/002258
§ 371 (c)(1),
(2) Date: Jul. 21, 2021

(87) PCT Pub. No.: WO2020/162200
PCT Pub. Date: Aug. 13, 2020

(65) Prior Publication Data
US 2022/0100164 A1    Mar. 31, 2022

(30) Foreign Application Priority Data

Feb. 8, 2019   (JP) ................................ 2019-021905

(51) Int. Cl.
G05B 19/29    (2006.01)
G05B 19/401   (2006.01)

(52) U.S. Cl.
CPC ......... *G05B 19/298* (2013.01); *G05B 19/401* (2013.01); *G05B 2219/32189* (2013.01);
(Continued)

(58) Field of Classification Search
None
See application file for complete search history.

(56) References Cited

U.S. PATENT DOCUMENTS

| 2017/0019053 A1 | 1/2017 | Kiyotani |
| 2018/0210407 A1 | 7/2018 | Namie et al. |
| 2018/0267486 A1 | 9/2018 | Manabe et al. |

FOREIGN PATENT DOCUMENTS

| JP | 2003-29845 A | 1/2003 |
| JP | 2004-120963 A | 4/2004 |

(Continued)

OTHER PUBLICATIONS

International Search Report for PCT/JP2020/002258 dated Mar. 31, 2020 (PCT/ISA/210).

(Continued)

*Primary Examiner* — Sean Shechtman
(74) *Attorney, Agent, or Firm* — Sughrue Mion, PLLC

(57) ABSTRACT

A control device is connected to a servo mechanism that drives a controlled object and outputs a manipulated variable to the servo mechanism so that a controlled variable tracks a target trajectory. The control device includes a controller and a sensor. The controller acquires a measured value from the sensor and performs model predictive control for each control period using a dynamics model representing a relationship between the manipulated variable and the position of the controlled object to generate the manipulated variable to be output to the servo mechanism. The sensor measures the position of the controlled object. The controller performs model predictive control in a first mode using the measured value when the controlled object has a position within the range, and performs model predictive control in a second mode using an output value of the dynamics model when the controlled object has a position outside the range.

10 Claims, 8 Drawing Sheets

(52) U.S. Cl.
    CPC .............. *G05B 2219/42044* (2013.01); *G05B 2219/42077* (2013.01); *G05B 2219/42155* (2013.01)

(56) References Cited

FOREIGN PATENT DOCUMENTS

| | | |
|---|---|---|
| JP | 2017-22933 A | 1/2017 |
| JP | 2018-120327 A | 8/2018 |
| JP | 2018-151899 A | 9/2018 |

OTHER PUBLICATIONS

Written Opinion for PCT/JP2020/002258 dated Mar. 31, 2020 (PCT/ISA/237).
Extended European Search Report dated Oct. 4, 2022 in European Application No. 20752283.0.
L. Bossi et al., "Multivariable predictive control for vibrating structures: An application", Control Engineering Practice, 2011, vol. 19, pp. 1087-1098 (12 pages total).

CONTROL DEVICE AND CONTROL PROGRAM

CROSS REFERENCE TO RELATED APPLICATIONS

This application is a National Stage of International Application No. PCT/JP2020/002258 filed Jan. 23, 2020, claiming priority based on Japanese Patent Application No. 2019-021905 filed Feb. 8, 2019, the entire contents of each of which being herein incorporated by reference in their entireties.

TECHNICAL FIELD

The present technology relates to a control device and a control program.

BACKGROUND ART

Japanese Patent Laid-Open No. 2004-120963 (PTL 1) discloses a servo control device including a vibration detection unit configured to sample internal control information to detect a period and amplitude of vibration, and a vibration control device including a period control unit configured to provide steady vibration convergence.

CITATION LIST

Patent Literature

PTL 1: Japanese Patent Laid-Open No. 2004-120963
PTL 2: Japanese Patent Laid-Open No. 2018-120327

SUMMARY OF INVENTION

Technical Problem

When vibration is generated as vibration frequency varies, the servo control device disclosed in PTL 1 performs vibration damping control after the vibration detection unit detects the vibration's period and amplitude. Accordingly, it is necessary to allow a vibrating state for a period of time, and starting the vibration damping control is delayed. In particular, when it is desired to damp residual vibration in positioning an object, it is difficult to detect vibration while the object moves, and accordingly, vibration will be detected after the object is stopped, and starting the vibration damping control is thus delayed.

The servo control device disclosed in PTL 1 uses a torque command value as the internal control information. Why the torque command value oscillates is attributed to a measured position fed back from the controlled object. However, depending on the performance of a measurement sensor that measures the position to be measured, the controlled object's movability range may not entirely be measurable. PTL 1, however, only considers a case with the controlled object having its position measured only within a portion of its movability range.

The present invention has been made in view of the above problem, and an object thereof is to provide a control device and program configured to better damp vibration in positioning a controlled object even when the controlled object has its position measured only within a portion of its movability range.

Solution To Problem

According to an example of the present disclosure, a control device is connected to a servo mechanism configured to drive a controlled object, and is configured to output a manipulated variable to the servo mechanism so that a controlled variable for the controlled object tracks a target trajectory. The control device includes an acquisition unit configured to acquire a measured value from a measurement sensor configured to measure a position of the controlled object, and a control unit configured to perform model predictive control for each control period using a dynamics model representing a relationship between a manipulated variable and the position of the controlled object to generate a manipulated variable to be output to the servo mechanism. The measurement sensor is capable of measuring the position of the controlled object in a predetermined range including a stationary position of the controlled object. The control unit performs model predictive control in a first mode using the measured value as the controlled variable for the current control period when the controlled object has a position within the predetermined range. The control unit performs model predictive control in a second mode using an output value of the dynamics model as the controlled variable for the current control period when the controlled object has a position outside the predetermined range.

According to the present disclosure, even when the controlled object has a position outside a measurable range, the model predictive control in the second mode is performed to generate a manipulated variable. This can better damp vibration and allows the target trajectory to be better tracked. Further, when the controlled object has a position within the measurable range (including a stationary position of the controlled object), the model predictive control in the first mode using a measured value can be performed to better damp vibration and allow the target trajectory to be better tracked. Thus, even when the controlled object has its position measured only within a portion of its movability range, it can be positioned while vibration is better damped.

In the above disclosure, the control unit in the first mode uses the measured value to calculate the output value of the dynamics model. In the model predictive control, the output value of the dynamics model is calculated as appropriate. According to the present disclosure, even when the controlled object has a state varying from the dynamics model, a measured value can be used to calculate a model output value and thus increase robustness against variation in state of the controlled object.

In the above disclosure, the control unit in the first mode compensates for an output value of the dynamics model calculated by the current control period by a difference between the measured value in the current control period and the output value of the dynamics model in the current control period.

According to the present disclosure, even when a measured value includes a noise component, the noise component being amplified when compensating for a previously calculated output value of the dynamics model can be suppressed.

In the above disclosure, the control unit performs control in a third mode only for N control periods when the controlled object has a position varying from outside the predetermined range to inside the predetermined range. N is an integer of two or more. The control unit in the third mode generates the manipulated variable to be output to the servo mechanism such that a difference between a first manipulated variable generated by the model predictive control in the first mode and a second manipulated variable generated by the model predictive control in the second mode is eliminated during the N control periods.

According to the present disclosure, variation in torque when the second mode is switched to the first mode can be suppressed.

In the above disclosure, the servo mechanism includes a servomotor configured to move the controlled object, and a servo driver configured to drive the servomotor. The dynamics model includes a first dynamics model representing a relationship between the manipulated variable and a position of a servomotor, and a second dynamics model representing a relationship between the position of the servomotor and the position of the controlled object. The second dynamics model is created using a waveform parameter obtained from a vibration waveform of the controlled object. Of a vibration frequency and an amplitude ratio of two successive waves in the vibration waveform, the waveform parameter includes at least the vibration frequency.

According to the present disclosure, the dynamics model can be easily created using the first dynamics model and the second dynamics model.

According to an example of the present disclosure, a control program configured to implement a control device connected to a servo mechanism configured to drive a controlled object, and configured to output a manipulated variable to the servo mechanism so that a controlled variable for the controlled object tracks a target value, causes a computer to perform acquiring a measured value from a measurement sensor configured to measure a position of the controlled object, and performing model predictive control for each control period using a dynamics model representing a relationship between a manipulated variable and the position of the controlled object to generate a manipulated variable to be output to the servo mechanism. The measurement sensor is capable of measuring the position of the controlled object in a predetermined range including a stationary position of the controlled object. The performing model predictive control includes performing model predictive control in a first mode using the measured value as the controlled variable for a current control period when the controlled object has a position within the predetermined range, and performing model predictive control in a second mode using an output value of the dynamics model as the controlled variable for the current control period when the controlled object has a position outside the predetermined range.

According to the present disclosure as well, even when the controlled object has its position measured only within a portion of its movability range, it can be positioned while vibration is better damped.

Advantageous Effects of Invention

According to the present invention, even when the controlled object has its position measured only within a portion of its movability range, it can be positioned while vibration is better damped.

DESCRIPTION OF EMBODIMENTS

An embodiment of the present invention will now be described in detail with reference to the drawings. Note that in the figures, identical or corresponding components are identically denoted, and accordingly, will not be described repeatedly.

§ 1. EXEMPLARY APPLICATION

Figure 1:
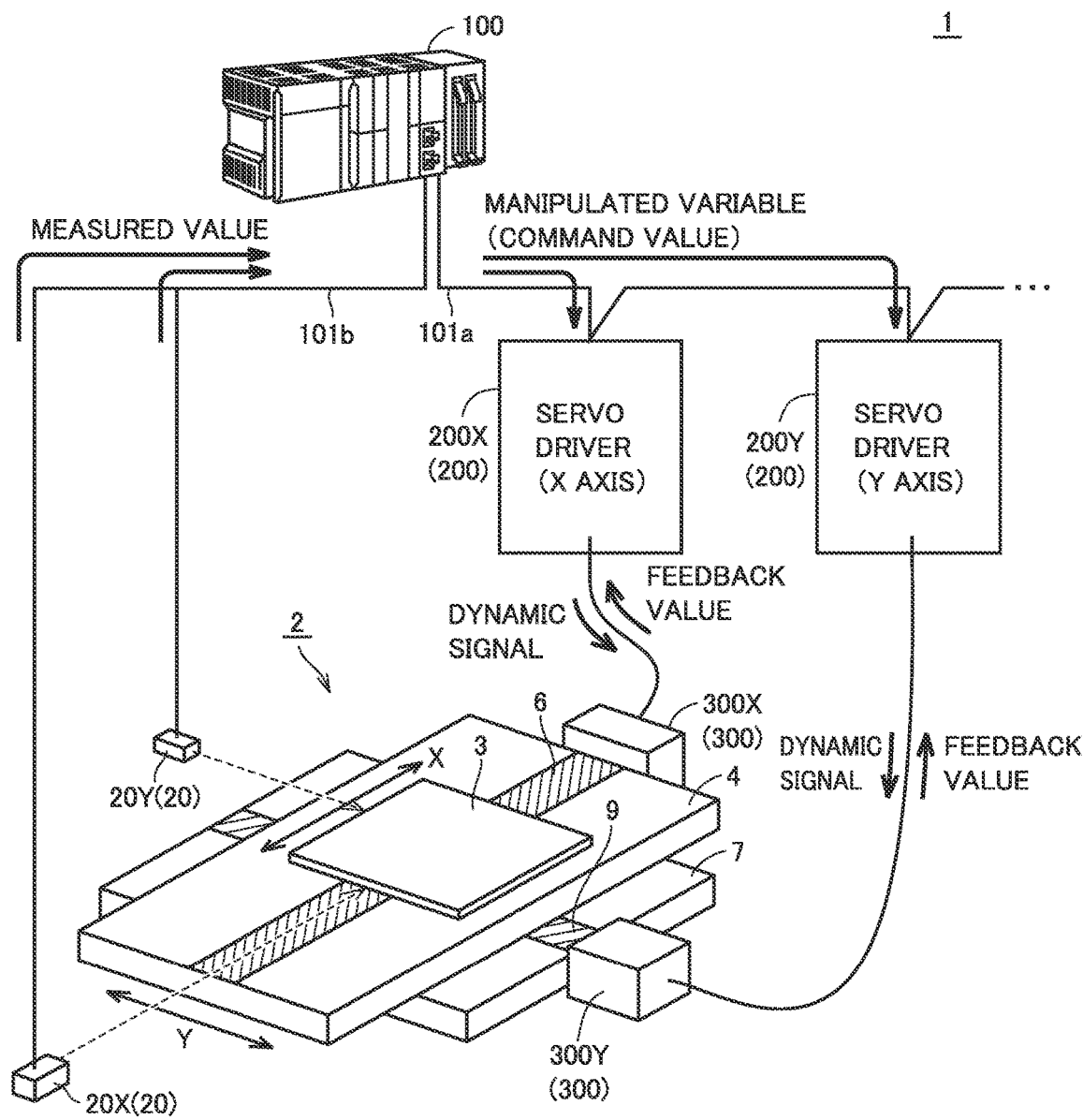
FIG. 1 is a schematic diagram showing a configuration example of a control system to which a control device according to the present embodiment is applied.

Initially, an example of a scenario in which the present invention is applied will be described with reference to FIG. 1. FIG. 1 is a schematic diagram showing a configuration example of a control system to which a control device according to the present embodiment is applied. FIG. 1 exemplarily shows a control system 1 including a controlled object 2 serving as a load, a measurement sensor 20 configured to measure the position of controlled object 2, one or more servo mechanisms, and a control device 100.

Controlled object 2 in the example shown in FIG. 1 is an XY stage capable of moving a working plate 3 in two directions orthogonal to each other with a workpiece disposed thereon. Controlled object 2 is not limited to the XY stage, and may be a device positioned at a designated position (a stationary position).

Controlled object 2 includes a first base plate 4 and a second base plate 7 in addition to working plate 3.

First base plate 4 is provided with a ball screw 6 to move working plate 3 in the X direction, as desired. Ball screw 6 is engaged with a nut included in working plate 3.

Further, second base plate 7 is provided with a ball screw 9 to move working plate 3 and first base plate 4 in the Y direction, as desired. Ball screw 9 is engaged with a nut included in first base plate 4.

The one or more servo mechanisms include one or more servomotors 300 configured to move working plate 3, and one or more servo drivers 200 configured to drive servomotors 300.

One or more servomotors 300 are motors configured to move controlled object 2, including working plate 3, and in the example shown in FIG. 1, include two servomotors 300X and 300Y. Servomotor 300X is coupled to one end of ball screw 6. When servomotor 300X is driven and thus rotated, the nut included in working plate 3 and ball screw 6 rotate relative to each other, and as a result, working plate 3 will move in the X direction. Servomotor 300Y is coupled to one end of ball screw 9. When servomotor 300Y is driven and thus rotated, the nut included in first base plate 4 and ball screw 9 rotate relative to each other, and as a result, working plate 3 and first base plate 4 will move in the Y direction.

In the example shown in FIG. 1, one or more servo drivers 200 include two servo drivers 200X and 200Y. Two servo drivers 200X and 200Y drive servomotors 300X and 300Y, respectively.

Servo driver 200 generates a drive signal for the associated servomotor 300 based on a command value (a command position or a command speed) received from control device 100 and a feedback value received from the associated servomotor 300. Servo driver 200 outputs the generated operation signal to servomotor 300 to drive servomotor 300.

For example, servo driver 200 receives as the feedback value a signal output from an encoder coupled to the rotation shaft of the associated servomotor 300. Servomotor 300's position, rotational phase, rotational speed, cumulative rotational speed, and the like can be detected from the feedback value.

Measurement sensor 20 measures the position of working plate 3 as the position of controlled object 2. Measurement sensor 20 transmits a measured value indicating a measured position to control device 100. In the example shown in FIG. 1, measurement sensor 20 includes two measurement sensors 20X and 20Y. Measurement sensors 20X and 20Y is each a displacement sensor such as a laser displacement meter.

Measurement sensor 20X measures the position of working plate 3 in the X direction. More specifically, measurement sensor 20X measures displacement of that end face of working plate 3 which is orthogonal to the X direction.

Measurement sensor 20Y measures the position of working plate 3 orthogonal to the Y direction. More specifically, measurement sensor 20Y measures displacement of that end face of working plate 3 which is orthogonal to the Y direction.

Generally, when measurement sensor 20 has an increased measurable range it has a decreased measurement resolution. Accordingly, measuring controlled object 2 (working plate 3 in this context) throughout its movability range while maintaining high measurement resolution requires preparing an expensive measurement sensor. Of vibration of controlled object 2, vibration required to be particularly damped is residual vibration when the controlled object is positioned after it stops. Accordingly, when measurement sensor 20 is a relatively inexpensive measurement sensor, measurement sensor 20 is installed so as to be able to measure the position of controlled object 2 in the movability range of controlled object 2 within a predetermined range including a stationary position of controlled object 2 (hereinafter also referred to as a "measurement target range").

Control device 100 is connected to one or more servo mechanisms and outputs a manipulated variable to the servo mechanism so that a controlled variable for controlled object 2 (the position of working plate 3 in this context) tracks a target trajectory. Control device 100 is connected to servo driver 200 and measurement sensor 20, and outputs a manipulated variable corresponding to a measured value received from measurement sensor 20 to servo driver 200 to positionally control controlled object 2 including working plate 3. Control device 100 and servo driver 200 can communicate data including the manipulated variable. Control device 100 and measurement sensor 20 can communicate data including the measured value.

FIG. 1 shows a configuration example in which control device 100 and servo driver 200 are connected via a field bus 101a and control device 100 and measurement sensor 20 are connected via a field bus 101b. However, such a configuration example is not exclusive, and any communication means may be employed. Alternatively, control device 100 may be connected to servo driver 200 and measurement sensor 20 directly by a signal line. Further, control device 100 and servo driver 200 may be integrated together. Any implementation may be employed insofar as an algorithm is implemented as will be described below.

Control device 100 performs model predictive control for each control period using a dynamics model representing a relationship between a manipulated variable and the position of controlled object 2 to generate a manipulated variable to be output to servo driver 200. Control device 100 outputs the generated manipulated variable to servo driver 200 as a command value (a command position or a command speed).

The dynamics model is a model of servo driver 200, servomotor 300, and controlled object 2, and is defined by a transfer function representing a relationship between a manipulated variable serving as an input value and the position of controlled object 2. The position of controlled object 2 is the position of working plate 3 in the example shown in FIG. 1. Model predictive control is a control method for determining an input value so that a deviation of the position of controlled object 2 from a target position is minimized.

The measurement target range of measurement sensor 20 is a part of the movability range of controlled object 2, and a measured value may or may not be obtained depending on the position of controlled object 2. Accordingly, when controlled object 2 has a position within the measurement target range, control device 100 performs model predictive control in a first mode using a measured value as a controlled variable for controlled object 2 for the current control period. In contrast, when controlled object 2 has a position outside the measurement target range, control device 100 performs model predictive control in a second mode using an output value of a dynamics model (hereinafter referred to as a "model output value") instead of a measured value as a controlled variable for controlled object 2 for the current control period. Thus, regardless of whether controlled object 2 has a position inside or outside the measurement target range, manipulated variable MV is generated through model predictive control. This can better damp vibration and allows the target trajectory to be better tracked.

Further, in the first mode, the measured value may be used to calculate the model output value. Thus, even when controlled object 2 has an actual state (e.g., a vibration frequency) varying from the dynamics model, a high vibration damping property can be maintained and robustness against variation in state of controlled object 2 can be increased.

In the second mode, a model output value is used instead of a measured value as a controlled variable for controlled object 2 for the current control period. The model predictive control in the second mode uses a model output value to generate a manipulated variable, and can better damp vibration and allows the controlled object to better track the target trajectory. Note, however, that their accuracy is lower than that in the model predictive control in the first mode. When controlled object 2 has a position outside the measurement target range, however, controlled object 2 is moving toward the stationary position. Accordingly, deterioration of vibration damping and that in accuracy of tracking the target trajectory do not cause a problem.

Thus, according to the present embodiment, the first mode is switched to the second mode and vice versa depending on whether controlled object 2 has a position within the measurement target range or not. Thus, even when the controlled object has its position measured only within a portion of its movability range, it can be positioned while vibration is better damped.

§ 2. Specific Example

A specific example of control device 100 according to the present embodiment will now be described.

<A. Exemplary Hardware Configuration of Control Device>

Control device 100 according to the present embodiment may be implemented using a PLC (programmable controller), for example. Control device 100 may implement processing, as will be described below, by a processor executing a control program (including a system program and a user program, as will be described hereinafter) stored previously.

Figure 2:
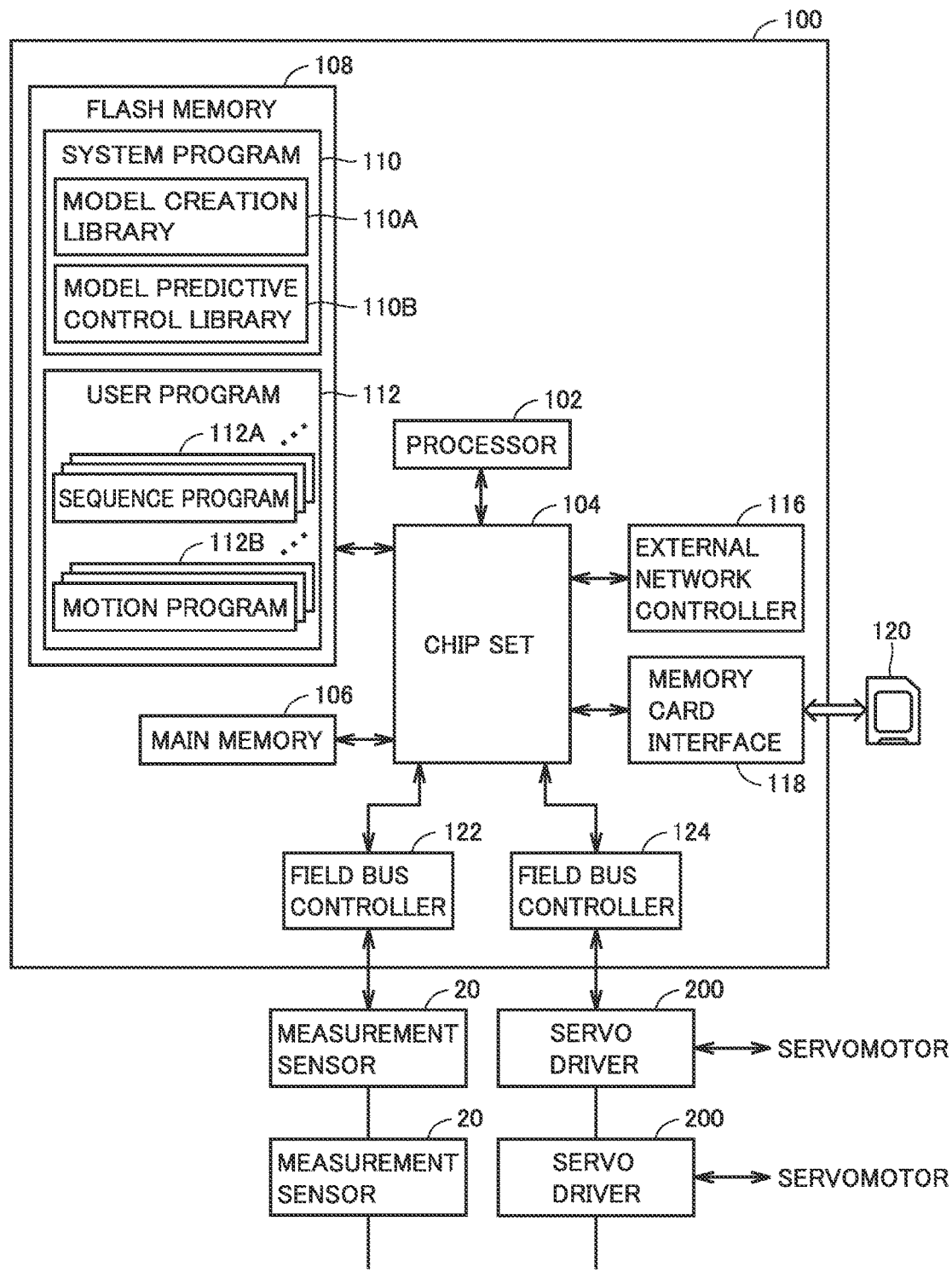
FIG. 2 is a schematic diagram showing an example of a hardware configuration of the control device according to the present embodiment.

FIG. 2 is a schematic diagram showing an example of a hardware configuration of control device 100 according to the present embodiment. As shown in FIG. 2, control device 100 includes a processor 102 such as a CPU (Central Processing Unit) or an MPU (Micro-Processing Unit), a chip set 104, a main memory 106, a flash memory 108, an external network controller 116, a memory card interface 118, and field bus controllers 122 and 124.

Processor 102 reads a system program 110 and a user program 112 stored in flash memory 108, and develops them in main memory 106 and executes them to implement any control for the controlled object. Processor 102 executes system program 110 and user program 112 to perform processing involved in outputting a manipulated variable output to servo driver 200, communicating data via the field bus, and the like, as will be described hereinafter.

System program 110 includes instruction codes for providing basic functions of control device 100, such as data input/output processing and execution timing control. System program 110 includes, as a part thereof, a model creation library 110A and a model predictive control library 110B. These libraries are a type of program module and include instruction codes for implementing processings and functions according to the present embodiment. User program 112 is designed depending on the controlled object, as desired, and includes a sequence program 112A for executing sequence control and a motion program 112B for executing motion control. Processings and functions according to the present embodiment are implemented by defining in user program 112 a model creation function block and a model predictive control function block using model creation library 110A and model predictive control library 110B, respectively. A function block is a component of a program executed by control device 100, and means a modularization of a program element which is used a plurality of times.

Chip set 104 controls components to implement processing as control device 100 as a whole.

Field bus controller 122 is an interface configured to communicate data with various devices coupled to control device 100 via a field bus. Measurement sensor 20 is connected as an example of such a device.

Field bus controller 124 is an interface configured to communicate data with various devices coupled to control device 100 via a field bus. As an example of such a device, servo driver 200 is connected.

Field bus controllers 122, 124 can issue any instruction to a device connected thereto and can obtain any data managed by the device.

External network controller 116 controls communicating data through various wired/wireless networks. Memory card interface 118 is configured to allow memory card 120 to be attached thereto and detached therefrom, and can write data to memory card 120 and read data from memory card 120.

<B. Servo Driver>

Operation of servo driver 200 connected to control device 100 according to the present embodiment will now be described. Servo driver 200 receives a manipulated variable output from control device 100 as a command value (a command position or a command speed), and receives a signal output from an encoder coupled to servomotor 300 as a feedback value. Servo driver 200 uses the command value and the feedback value to perform a control operation in accordance with a control loop of a model tracking control system, for example.

When servo driver 200 receives a command position as the command value, servo driver 200 performs a control operation in accordance with a position control loop and a speed control loop. When servo driver 200 receives a command speed as the command value, servo driver 200 performs a control operation in accordance with the speed control loop.

Servo driver 200 performs the control operation in accordance with the position control loop to calculate a command speed corresponding to a positional deviation between a measured position of servomotor 300 obtained from a feedback value and the command position provided from control device 100.

Servo driver 200 performs the control operation in accordance with the speed control loop to calculate a torque corresponding to a speed deviation between the command speed and a measured speed of servomotor 300 obtained from a feedback value. Servo driver 200 outputs an operation signal indicating a command for a current to cause servomotor 300 to generate the calculated torque.

<C. Exemplary Functional Configuration of Control Device>

Figure 3:
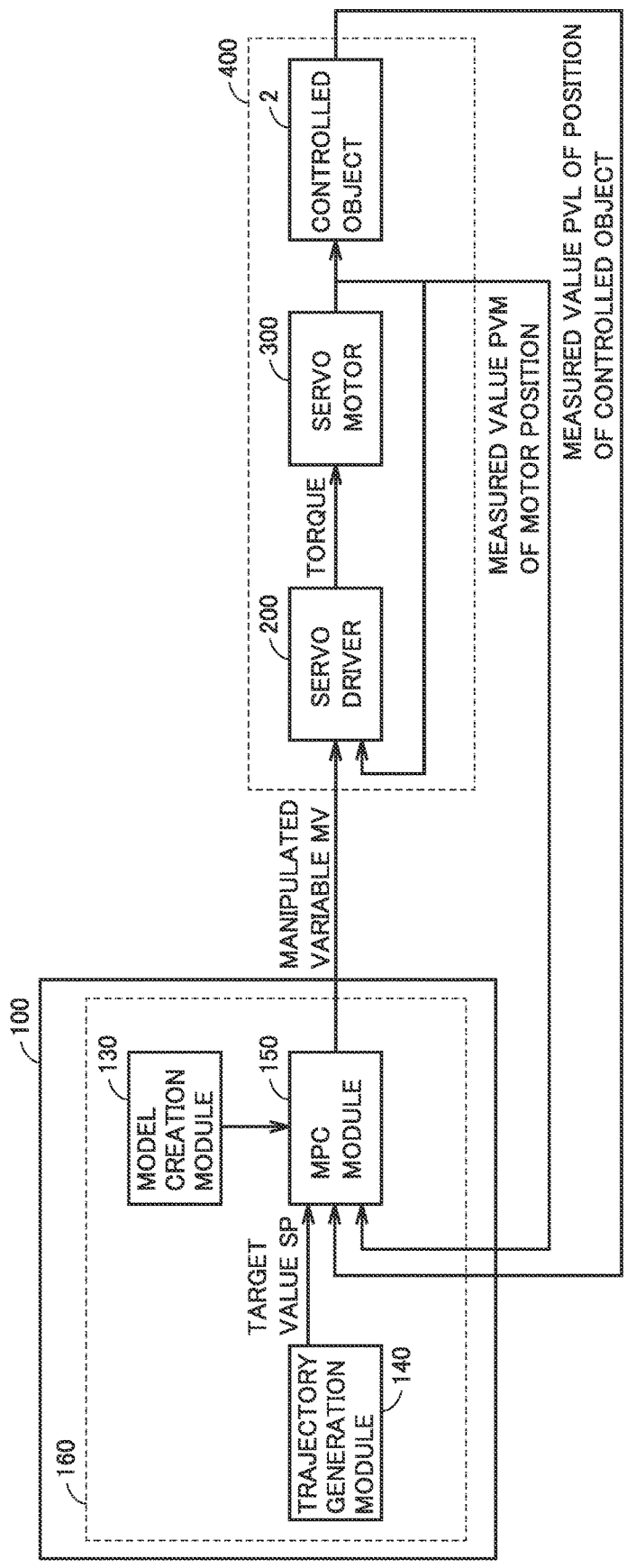
FIG. 3 is a schematic diagram showing a functional configuration of the control device according to the present embodiment.

FIG. 3 is a schematic diagram showing a functional configuration of the control device according to the present embodiment. As shown in FIG. 3, control device 100 includes a control unit 160 including a model creation module 130, a trajectory generation module 140, and a model predictive control module 150. In the figure, model predictive control is referred to as "MPC". Control device 100 includes two control units 160 corresponding to servo drivers 200X and 200Y, respectively. However, only one of the two control units 160 is illustrated in FIG. 3 for simplicity.

Model creation module 130 is typically implemented as the model creation function block is defined in user program 112 and thereby model creation library 110A is called. That is, model creation module 130 is functionalized by a function block defined in user program 112.

Model creation module 130 creates a dynamics model representing dynamics of a target to be modelled 400 composed of servo driver 200 and servomotor 300 (hereinafter referred to as a "dynamics model P"). Model creation module 130 provides model predictive control module 150 with a characteristic parameter which defines the created dynamics model P.

Trajectory generation module 140 generates time-series data of a target value SP indicating target positions for controlled object 2 along a previously specified target trajectory, and sequentially reads target value SP corresponding to each control period from the time-series data and inputs it to model predictive control module 150. Specifically, trajectory generation module 140 extracts from the time-series data of target value SP a plurality of target values SP for a period of time from the current time to the end of a prediction horizon serving as a fixed period of time in the future, and inputs the plurality of extracted target values SP to model predictive control module 150.

Control device 100 may previously store the time-series data of target value SP that defines the target trajectory. In that case, trajectory generation module 140 accesses the previously stored time-series data of target value SP. Thus, target value SP for each control period that defines the target trajectory may be stored previously in the form of time-series data, or target value SP for each control period may be sequentially calculated according to a predetermined calculation formula.

Model predictive control module 150 is typically implemented as the model predictive control function block is defined in user program 112 and thereby model predictive control library 110B is called. That is, model predictive control module 150 is functionalized by a function block defined in user program 112.

Model predictive control module 150 uses dynamics model P to perform model predictive control for each control period to generate manipulated variable MV to be output to servo driver 200. Model predictive control module 150 outputs the generated manipulated variable MV as a command value to servo driver 200.

When controlled object 2 has a position within the measurement target range of measurement sensor 20, model predictive control module 150 performs model predictive control in a first mode using a measured value PVL as a controlled variable for controlled object 2 for the current control period. When controlled object 2 has a position outside the measurement target range, model predictive control module 150 performs model predictive control in a second mode using a model output value instead of measured value PVL as a controlled variable for the current control period. A specific example of the model predictive control will be described hereinafter.

When target value SP corresponding to the current control period is within the measurement target range, model predictive control module 150 may determine that controlled object 2 has a position within the measurement target range. Alternatively, when a model output value in the current control period is within the measurement target range, model predictive control module 150 may determine that controlled object 2 has a position within the measurement target range. Alternatively, when a distance to the measured object falls within an unmeasurable range and measurement sensor 20 outputs an error signal, then, model predictive control module 150 may determine, while the error signal is received from measurement sensor 20, that controlled object 2 has a position outside the measurement target range.

Alternatively, measurement sensor 20 may output any measured value ranging from a lower limit value to an upper limit value, and output the lower limit value when an actual distance to the measured object is equal to or less than the lower limit value, and output the upper limit value when an actual distance to the measured object is equal to or more than the upper limit value. When a measured value received from measurement sensor 20 is the upper limit value or the lower limit value, model predictive control module 150 may determine that controlled object 2 has a position outside the measurement target range, and otherwise determine that controlled object 2 has a position within the measurement target range.

<D. Dynamics Model P>

Dynamics model P is created by tuning performed in advance. When the position of controlled object 2 can be measured throughout the movability range of controlled object 2, dynamics model P is created based on a manipulated variable and a measured position of controlled object 2 that are obtained in advance through tuning. For example, dynamics model P is created by preparing a measurement sensor capable of measuring the position of controlled object 2 throughout the movability range of controlled object 2.

Dynamics model P is represented for example by the following function $P(z^{-1})$. Function $P(z^1)$ is a discrete time transfer function obtained by combining a dead time element and an n-order delay element. In the dynamics model represented by function $P(z^{-1})$, a dead time d for the dead time element and variables $a_1$-$a_n$ and $b_1$-$b_m$ for the n-order delay element are determined as characteristic parameters. A dead time is a period of time elapsing since an input value is provided before an output corresponding thereto appears (that is, a delay time between input and output). Note that optimal values may also be determined for the order n and the order m.

$$P(z^{-1}) = z^{-d} \frac{b_1 z^{-1} + b_2 z^{-2} + \cdots + b_n z^{-n}}{1 + a_1 z^{-1} + a_2 z^{-2} + \cdots + a_n z^{-n}} \quad \text{[Expression 1]}$$

A process of creating such characteristic parameters (that is, system identification) may be performed through least squares or the like.

Specifically, the characteristic parameters have their values determined such that an output y obtained when a manipulated variable (e.g., a command position) is given to a variable u of $y=P(z^{-1})*u$ matches a measured position of controlled object 2 (that is, such that a minimal error is provided).

In doing so, dead time d may be determined in advance and a measured position of controlled object 2 is advanced by the determined dead time d to generate a compensated time waveform, and the remaining element of the transfer function other than the dead time element may be determined based on the compensated time waveform.

When controlled object 2 cannot be measured throughout its movability range, dynamics model P may be created by combining a first dynamics model $P_{CM}$ representing a relationship between a manipulated variable and the position of servomotor 300 (hereinafter referred to as a "motor position") and a second dynamics model $P_{ML}$ representing a relationship between the motor position and the position of controlled object 2. That is, dynamics model P is created according to $P=P_{CM}*P_{ML}$.

First dynamics model $P_{CM}$ is a model of servo driver 200 and servomotor 300, and is defined by a transfer function representing a relationship between a manipulated variable as an input value and a motor position as an output value. Generally, servomotor 300 is provided with an encoder, and the motor position is continuously and highly accurately measured by a feedback value received from the encoder. Accordingly, the first dynamics model is created based on the measured value of the motor position.

Second dynamics model $P_{ML}$ is a model of controlled object 2, and is defined by a transfer function representing a relationship between a motor position as an input value and a position of controlled object 2 as an output value. The motor position and the position of controlled object 2 have a relationship depending on the vibration of controlled object 2. Accordingly, second dynamics model $P_{ML}$ is created using a waveform parameter extracted from the vibration waveform of controlled object 2. Of a vibration frequency (typically, eigenfrequency) of controlled object 2 and an amplitude ratio of two successive waves in the vibration waveform, the waveform parameter includes at least the vibration frequency. The vibration waveform of controlled object 2 is easily obtained from a measurement result obtained through measurement sensor 20.

<D-1. Creating First Dynamics Model $P_{CM}$>

A method for creating first dynamics model $P_{CM}$ will now be described. First dynamics model $P_{CM}$ is created using a method disclosed in Japanese Patent Laid-Open No. 2018-120327 (PTL 2), for example. First dynamics model $P_{CM}$ is created by tuning before model predictive control is performed.

Figure 4:
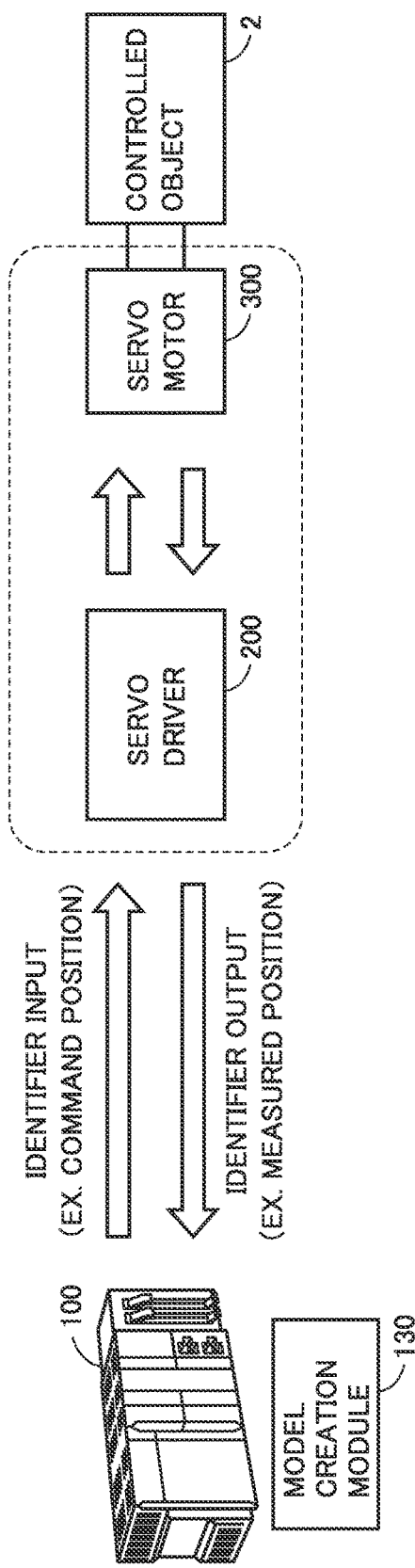
FIG. 4 is a diagram for illustrating tuning performed to create a first dynamics model.

FIG. 4 is a diagram for illustrating tuning performed to create first dynamics model $P_{CM}$. As shown in FIG. 4, model creation module 130 of control device 100 sequentially outputs to servo driver 200 a plurality of manipulated variables (e.g., command positions) that are preset for tuning, and obtains measured positions of servomotor 300. A measured position of servomotor 300 is determined from a feedback value output from an encoder coupled to the rotation shaft of servomotor 300. Model creation module 130 can use a manipulated variable and a measured position of servomotor 300 as an identifier input and an identifier output, respectively, and use a relationship of the identifier output with respect to the identifier input to apply system identification to generate first dynamics model $P_{CM}$.

First dynamics model $P_{CM}$ is represented for example by the following function $P_{CM}(z^{-1})$. Function $P_{CM}(z^{-1})$ is a discrete time transfer function obtained by combining a dead time element and an n-order delay element. In the first dynamics model represented by function $P_{CM}(z^{-1})$, dead time d for the dead time element and variables $a_{CM1}$-$a_{CMn}$ and $b_{CM1}$-$b_{CMm}$ for the n-order delay element are determined as characteristic parameters. Note that optimal values may also be determined for the order n and the order m.

$$P_{CM}(z^{-1}) = z^{-d}\frac{b_{CM1}z^{-1} + b_{CM2}z^{-2} + \cdots + b_{CMm}z^{-m}}{1 + a_{CM1}z^{-1} + a_{CM2}z^{-2} + \cdots + a_{CMn}z^{-n}}$$ [Expression 2]

A process of creating such characteristic parameters (that is, system identification) may be performed through least squares or the like using an identifier input and an identifier output.

Specifically, the characteristic parameters have their values determined such that an output y obtained when a manipulated variable selected as an identifier input is given to a variable u of $y=P_{CM}(z^{-1})*u$ matches a measured position of servomotor 300 selected as an identifier output (that is, such that a minimal error is provided).

In doing so, dead time d may be determined in advance and an identifier output is advanced by the determined dead time d to generate a compensated time waveform, and the remaining elements of the transfer function other than the dead time element may be determined based on the compensated time waveform.

A plurality of first dynamics models may be calculated by varying the order n and the order m. In that case, an optimal first dynamics model $P_{CM}$ is created based on one or more evaluation criteria. The evaluation criteria include a degree indicative of reliability of identification (a FIT rate), validity of dead time, and the like. For a static system model, a steady-state gain's validity may be applied as an evaluation criterion.

A FIT rate is a value indicating a rate of matching between an output calculated when an identifier input is given to function $P_{CM}(z^{-1})$ defined by a calculated characteristic parameter and an actually collected identifier output. For such a FIT rate, a known calculation formula used to calculate an error can be used. Basically, a calculation formula with a maximal FIT rate (that is, with a maximal matching rate/a minimal error) may be selected.

In evaluating the first dynamics model, a model exhibiting a peculiar behavior may be excluded. For example, when a dynamics model exhibits a peculiar behavior that is not included in an inherent characteristic of the controlled object, it is not considered to present the inherent characteristic of the controlled object, and accordingly, it may be excluded as a problematic dynamics model.

Thus, in the process for calculating first dynamics model $P_{CM}$, a plurality of first dynamics models with characteristic parameters varied may be calculated. In that case, the FIT rate described above may be used to create one of the plurality of first dynamics models.

<D-2. Creating Second Dynamics Model $P_{ML}$>

A method for creating second dynamics model $P_{ML}$ will now be described. Second dynamics model $P_{ML}$ is created using a vibration waveform of controlled object 2 that is obtained in the tuning performed before model predictive control is performed. For example, in the tuning performed to create first dynamics model $P_{CM}$, measurement sensor 20 measures a vibration waveform of working plate 3 immediately after servomotor 300 is stopped from rotating.

Figure 5:
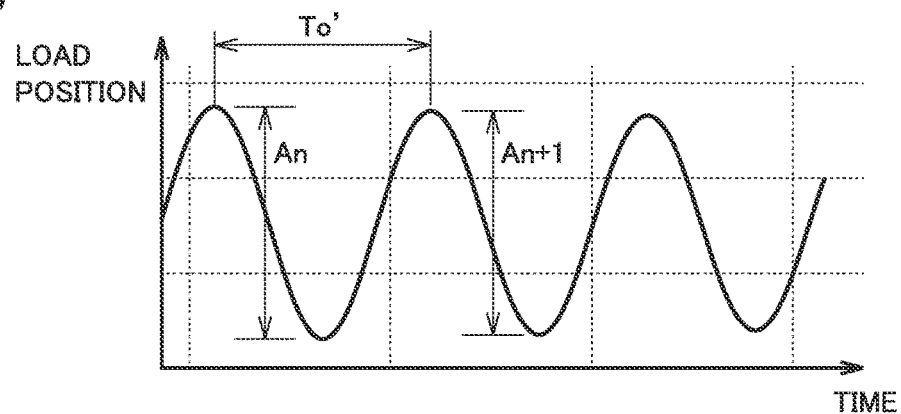
FIG. 5 is a diagram showing an example of a vibration waveform.

FIG. 5 is a diagram showing an example of the vibration waveform. FIG. 5 shows a graph in which the horizontal axis represents time and the vertical axis represents the position of controlled object 2 (denoted as "load position" in the figure). Even when servomotor 300 is stopped from rotating, controlled object 2 including working plate 3 vibrates. Working plate 3 vibrates in accordance with an eigenfrequency corresponding to controlled object 2. Accordingly, model creation module 130 of control device 100 extracts a vibration period $T_0'$ from the vibration waveform, and calculates a vibration frequency $f_0$ from $f_0=1/T_0'$. Alternatively, model creation module 130 may consider influence of damping and follow an expression 3 indicated below to calculate vibration frequency $f_0$. $\zeta$ represents a vibration damping ratio.

$$f_0 = 1/(\sqrt{1-\zeta^2}T_0)$$ [Expression 3]

Model creation module 130 uses the calculated vibration frequency $f_0$ to create second dynamics model $P_{ML}$. Second dynamics model $P_{ML}$ is represented by a function $P_{ML}(s)$, for example as indicated below by the following expression 4. In function $P_{ML}(s)$, $\omega_0$ is the angular frequency of vibration of controlled object 2, and it is indicated by $\omega_0=2\pi f_0$. Model creation module 130 can use the calculated vibration frequency $f_0$ to create function $P_{ML}(s)$ represented by expression 4.

$$P_{ML}(s) = \frac{\omega_0^2}{s^2 + \omega_0^2}$$ [Expression 4]

Second dynamics model $P_{ML}$ may be represented by a function $P_{ML}(s)$ as indicated below by the following expression 5 or 6.

$$P_{ML}(s) = \frac{\omega_0^2}{s^2 + 2\zeta\omega_0 s + \omega_0^2}$$ [Expression 5]

-continued $$P_{ML}(s) = \frac{2\zeta\omega_0 s + \omega_0^2}{s^2 + 2\zeta\omega_0 s + \omega_0^2} \quad \text{[Expression 6]}$$

$\zeta$ is expressed as $\zeta=\delta/(\delta^2+4\pi^2)^{1/2}$ using logarithmic decrement $\delta$. Logarithmic decrement $\delta$ is expressed by $\delta=\ln(1/Adr)$ using an amplitude ratio Adr of two successive waves in a vibration waveform and natural logarithm ln. Amplitude ratio Adr is represented by a ratio of amplitudes $A_n$ and $A_n+1$ of two successive waves in the vibration waveform shown in FIG. 5, i.e., $A_n+1/A_n$. Accordingly, model creation module 130 can extract amplitude ratio Adr and vibration frequency $f_0$ from the vibration waveform and use the extracted amplitude ratio Adr and vibration frequency $f_0$ to create function $P_{ML}(s)$ of expression 5 or 6.

Model creation module 130 may transform function $P_{ML}(s)$ of expressions 4 to 6 into a discrete time format (or perform Z transform) and create second dynamics model $P_{ML}$ represented by the transformed function $P_{ML}(z^{-1})$.

<E. Example of Processing Through Model Predictive Control>

<E-1. Overview of Model Predictive Control>

Model predictive control module 150 inputs manipulated variables $MV_k, \ldots, MV_{-m+1}$ generated by the current control period k to dynamics model P represented by function $P(z^{-1})$ of an expression 1 to calculate a model output value $YL_{k+d+1}$ for a control period k+d+1. Herein, m represents an order defined by dynamics model P, as described above. Control period k+d+1 is a future control period after dead time d+1 defined in the dynamics model elapses since the current control period k.

Model output value $YL_{k+d+1}$ thus obtained is used to generate manipulated variable MV for a subsequent control period. In doing so, the calculated data is shifted by one control period in preparation for the subsequent control period. For example, model output value $YL_{k+d+1}$ thus obtained is used as a model output value $YL_{k+d}$ in the subsequent control period. In other words, in the current control period k, model output value $YL_{k+d+1}$ calculated in the previous control period is used as model output value $YL_{k+d}$. Model predictive control module 150 performs model predictive control using model output value $YL_{k+d}$ calculated in the previous control period and dynamics model P to generate manipulated variable $MV_k$ to be output to servo driver 200 in the current control period k.

Model predictive control module 150 for example follows the following calculation method to generate manipulated variable $MV_k$ to be output to servo driver 200 in the current control period k.

Once dynamics model P has been created, model predictive control module 150 performs step response calculation and ramp response calculation.

Step response calculation is calculation to obtain an output of dynamics model P when a maximum input (a step input) is continued in an initial state with an output of 0 (hereinafter referred to a "step output Ys"). In the following description, step output Ys at a time i (>dead time d) elapsing since inputting the step input is started is indicated as Ys(i).

Ramp response calculation is a calculation to obtain an output of dynamics model P when an input increased by one step for each control period (i.e., a ramp input) is provided in an initial state having an output of 0 (hereinafter referred to a "ramp output Yr"). In the following description, ramp output Yr at time i (>dead time d) elapsing since inputting the ramp input is started is indicated as Yr(i).

Further, model predictive control module 150 performs free response calculation with model output value $YL_{k+d}$ set in a designated state. Free response calculation is a calculation to obtain an output Yf (k+d+H) of dynamics model P in a designated state in control period k+d for a control period k+d+H later than control period k+d when an input for the current control period k et. seq. is 0.

With a step output having a magnitude ks and a ramp output having a magnitude kr, model predictive control module 150 calculates an output $MH_{k+d+H}$ of dynamics model P for control period k+d+H later than control period k+d in accordance with the following expression:

$$MH_{k+d+H}=ks*Ys(H)+kr*Yr(H)+Yf(k+d+H).$$

Model predictive control module 150 obtains ks and kr so that a difference $\Delta MH$ between $MH_{k+d+H}$ and model output value $YL_{k+d}$ matches a difference $\Delta PH$ between a position $RH_{k+d+H}$ on a reference trajectory for control period k+d+H and controlled variable $PV_k$ for controlled object 2 (herein, a position of working plate 3) in the current control period k. The reference trajectory is specified by a target value $SP_{k+d+H}$ for control period k+d+H, target value $SP_k$ and controlled variable $PV_k$ for the current control period k, and a predetermined reference trajectory time constant Tr. In order to obtain two variables ks and kr, two values are set as H. The two values set as H are periods of time shorter than the vibration period of controlled object 2, and they are for example ⅛ and ¼ of the vibration period. And variables ks and kr are calculated by solving simultaneous equations composed of the equations for the two values.

Model predictive control module 150 may generate a product of ks obtained as described above and the step input as manipulated variable $MV_k$ to be output to servo driver 200 in the current control period k.

<E-2. Method for Calculation Through Model Predictive Control in First and Second Modes>

As has been discussed above, model predictive control module 150 obtains ks and kr such that $\Delta MH$ and $\Delta PH$ match. In order to obtain ks and kr, it is necessary to determine controlled variable $PV_k$ for controlled object 2 for the current control period k.

When controlled object 2 has a position within the measurement target range, control device 100 has obtained from measurement sensor 20 measured value PVL indicating a measured position of controlled object 2. Accordingly, model predictive control module 150 performs model predictive control in the first mode using measured value PVL as controlled variable $PV_k$ for controlled object 2 for the current control period k.

On the other hand, when controlled object 2 has a position outside the measurement target range, control device 100 cannot use measured value PVL received from measurement sensor 20. Accordingly, model predictive control module 150 performs model predictive control in the second mode using model output value $YL_k$ instead of measured value PVL as controlled variable $PV_k$ for controlled object 2 for the current control period k.

Furthermore, as has been set forth above, model predictive control module 150 inputs manipulated variables $MV_k, \ldots, MV_{k-m+1}$ generated by the current control period k to dynamics model P represented by function $P(z^{-1})$ of expression 1 to calculate a model output value $YL_{k+d+1}$ for control period k+d+1. Model output value $YL_{k+d+1}$ is used to generate manipulated variable MV in the subsequent control period. That is, in order to generate manipulated variable MV for the subsequent control period, model predictive control module 150 calculates model output value $YL_{k+d+1}$ for a future control period elapsing since the current control period by a dead time defined in the dynamics model.

When calculating model output value $YL_{k+d+1}$ for a certain control period, model predictive control module 150 needs to input to dynamics model P a position of controlled object 2 assumed in a control period preceding the certain control period. In the model predictive control in the first mode, control device 100 obtains measured value PVL from measurement sensor 20. Accordingly, model predictive control module 150 calculates model output value $YL_{k+d+1}$ using measured value PVL obtained from measurement sensor 20. That is, the model predictive control in the first mode applies a reset model type.

In contrast, in the model predictive control in the second mode, control device 100 cannot obtain measured value PVL from measurement sensor 20. Accordingly, model predictive control module 150 calculates model output value $YL_{k+d+1}$ using a model output value YL calculated in a past control period. That is, the model predictive control in the second mode applies an independent model type.

Hereinafter, an example of a method for calculation through the reset model type and the independent model type will be described. Hereinafter will be described an example in which dynamics model P is expressed by a function $P(z^{-1})$ expressed by the following expression 7.

$$P(z^{-1}) = z^{-d} \frac{b_1 z^{-1}}{1 + a_1 z^{-1}}$$ [Expression 7]

<E-2-1. Example of Calculating Model Output Value $YL_{k+d+1}$ in Accordance with Independent Model Type>

In the independent model type, model predictive control module 150 may input model output value $YL_{k+d}$ calculated in the previous control period and manipulated variable $MV_k$ generated in the current control period k to dynamics model P to calculate model output value $YL_{k+d+1}$ for control period k+d+1 in accordance with the following expression:

$$YL_{k+d+1} = -a_1 YL_{k+d} + b_1 MV_k.$$

<E-2-2. First Example of Calculating Model Output Value $YL_{k+d+1}$ in Accordance with Reset Model Type>

In the reset model type, measured value $PVL_k$ indicating a measured position of controlled object 2 in the current control period k is fed back from measurement sensor 20. Model predictive control module 150 uses measured value $PVL_k$ as controlled variable $PV_k$ for controlled object 2 for the current control period k to update a model output value $YL_{k+1}$ for a subsequent control period k+1 in accordance with the following expression:

$$YL_{k+1} = -a_1 PVL_k + b_1 MV_{k-d}.$$

$MV_{k-d}$ denotes a manipulated variable generated in a past control period k–d.

As no measured position is measured for subsequent control period k+1 et. seq., model predictive control module 150 uses calculated model output value YL to update model output value YL up to control period k+d in accordance with the following expression:

$$YL_{k+2} = -a_1 YL_{k+1} + b_1 MV_{k-d+1}$$

$$\ldots$$

$$YL_{k+d} = -a_1 YL_{k+d-1} + b_1 MV_{k-1}.$$

Model predictive control module 150 may input model output value $YL_{k+d}$ updated in accordance with the above expression and manipulated variable $MV_k$ generated in the current control period k to dynamics model P to calculate model output value $YL_{k+d+1}$ for control period k+d+1 in accordance with the following expression:

$$YL_{k+d+1} = -a_1 YL_{k+d} + b_1 MV_k.$$

<E-2-3. Second Example of Calculating Model Output Value $YL_{k+d+1}$ in Accordance with Reset Model Type>

In the first example, when measured value $PVL_k$ includes a noise component, and model output values $YL_{k+1}$ to $YL_{k+d}$ are updated, the noise component would be amplified. Accordingly, model predictive control module 150 may update model output value $YL_k$ to $YL_{k+d}$ by the following calculation method in order to suppress the amplification of the noise component when measurement is performed.

Model predictive control module 150 calculates a difference value between model output value $YL_k$ and measured value $PVL_k$ in the current control period k as a compensated variable CL. That is, compensated variable CL is expressed as follows:

$$CL = PVL_k - YL_k.$$

Subsequently, model predictive control module 150 updates model output value $YL_k$ to measured value $PVL_k$, and uses compensated variable CL to update model output value YL up to control period k+d in accordance with the following expression:

$$YL_{k+1} \leftarrow YL_{k+1} + CL$$

$$\ldots$$

$$YL_{k+d} \leftarrow YL_{k+d} + CL$$

Note that model output values $YL_{k+1}$ to $YL_{k+d}$ have been calculated in past control periods k–d to k–1, respectively. That is, model predictive control module 150 compensates by compensated variable CL for model output values $YL_{k+1}$ to $YL_{k+d}$ calculated by the previous control period.

Model predictive control module 150 uses model output value $YL_{k+d}$ compensated for in accordance with the above expression and dynamics model P to calculate a model output value $YL_{k+d+1}$ for control period k+d+1. Specifically, model predictive control module 150 may input model output value $YL_{k+d}$ and manipulated variable $MV_k$ generated in the current control period k to dynamics model P to calculate model output value $YL_{k+d+1}$ for control period k+d+1 in accordance with the following expression:

$$YL_{k+d+1} = -a_1 YL_{k+d} + b_1 MV_k.$$

<E-3. Method for Calculating Model Output Through First and Second Dynamics Models $P_{CM}$ and $P_{ML}$>

When dynamics model P is divided into first dynamics model $P_{CM}$ and second dynamics model $P_{ML}$, first and second dynamics models $P_{CM}$ and $P_{ML}$ may be used to calculate an output of dynamics model P.

Figure 6:
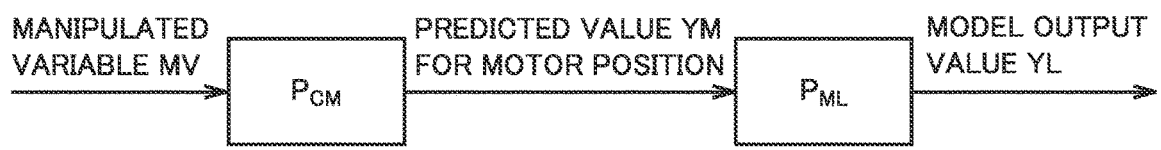
FIG. 6 is a diagram showing an example of a method for calculating a model output value by using the first dynamics model and a second dynamics model.

FIG. 6 is a diagram showing an example of a method for calculating model output value YL through first and second dynamics models $P_{CM}$ and $P_{ML}$. As shown in FIG. 6, model predictive control module 150 can input manipulated variable MV to first dynamics model $P_{CM}$ to calculate a predicted value YM for a position of servomotor 300 corresponding to manipulated variable MV. Model predictive control module 150 can input the calculated predicted value YM to second dynamics model $P_{ML}$ to calculate model output value YL corresponding to predicted value YM.

In order to predict model output value YL more accurately, model predictive control module 150 may receive a measured value PVM fed back from servomotor 300 and indicating a measured position of servomotor 300, and use measured value PVM to compensate for predicted value YM.

For example, model predictive control module 150 calculates a difference value between a predicted value $YM_k$ and a measured value $PVM_k$ in the current control period k as a compensated variable CM. That is, compensated variable CM is expressed as follows:

$$CM = PVM_k - YM_k.$$

Note that predicted value $YM_k$ for the current control period k has been calculated in a past control period k−d−1.

Subsequently, model predictive control module 150 compensates for predicted value $YM_k$ to measured value $PVM_k$, and uses compensated variable CM to update predicted value YM up to control period k+d in accordance with the following expression:

$$YM_{k+1} \leftarrow YM_{k+1} + CM$$

$$\ldots$$

$$YM_{k+d} \leftarrow YM_{k+d} + CM$$

Note that predicted values $YM_{k+1}$ to $YM_{k+d}$ have been calculated in past control periods k−d to k−1, respectively.

Model predictive control module 150 may use the updated predicted value $YM_{k+d}$, manipulated variable $MV_k$ generated in the current control period k, and first dynamics model $P_{CM}$ to calculate predicted value $YM_{k+d+1}$ for a motor position for control period k+d+1. For example, it is assumed that first dynamics model $P_{CM}$ is represented by a function $P_{CM}(z^{-1})$ of the following expression (8):

$$P_{CM}(z^{-1}) = z^{-d} \frac{b_{CM1} z^{-1}}{1 + a_{CM1} z^{-1}} \quad \text{[Expression 8]}$$

When first dynamics model $P_{CM}$ is represented by function $P_{CM}(z^{-1})$ of expression (8), model predictive control module 150 may follow:

$$YM_{k+d+1} = -a_{CM1} YM_{k+d} + b_{CM1} MV_k$$

to calculate predicted value $YM_{k+d+1}$.

Thus, model predictive control module 150 compensates for predicted value YM. How model predictive control module 150 compensates for predicted value YM is not limited to the above-described compensation method, and a different calculation method may be used.

Model predictive control module 150 uses the compensated predicted value YM and second dynamics model $P_{ML}$ to calculate model output value YL. For example, it is assumed that second dynamics model $P_{ML}$ is represented by a function $P_{ML}(z^{-1})$ of the following expression (9):

$$P_{ML}(z^{-1}) = \frac{b_{ML1} + b_{ML2} z^{-1}}{1 + a_{ML1} z^{-1} + a_{ML2} z^{-2}} \quad \text{[Expression 9]}$$

When second dynamics model $P_{ML}$ is represented by function $P_{ML}(z^{-1})$ of expression (9), model predictive control module 150 may follow:

$$YL_{k+d+1} = -a_{ML1} YL_{k+d} - a_{ML2} YL_{k+d-1} + b_{ML1} YM_{k+d+1} + b_{ML2} YM_{k+d}$$

to calculate model output value $YL_{k+d+1}$ for control period k+d+1.

<F. Processing Procedure>

Figure 7:
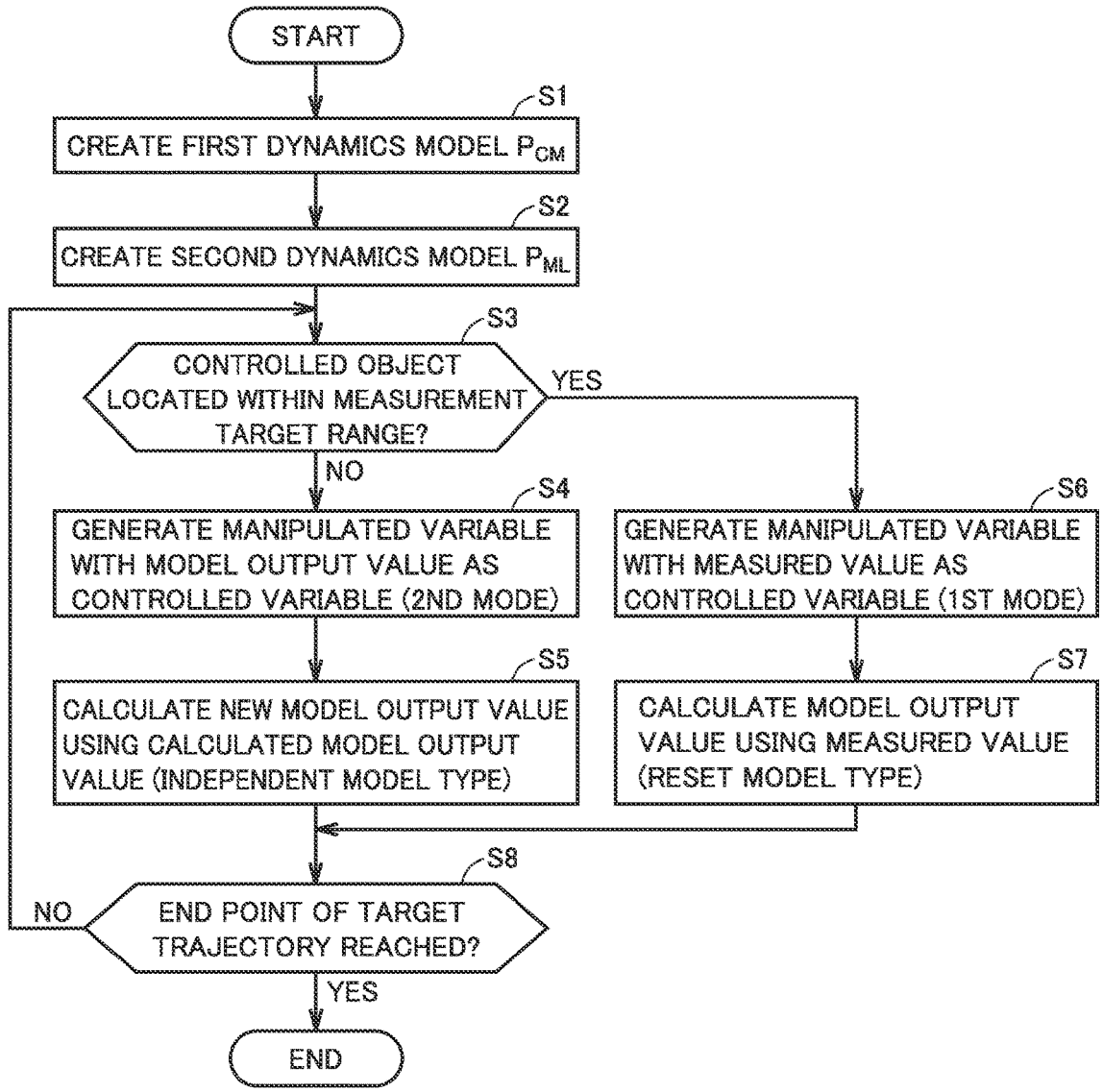
FIG. 7 is a flowchart showing a processing procedure for motor control by the control system according to the present embodiment.

A processing procedure for motor control by control device 100 according to the present embodiment will now be outlined. FIG. 7 is a flowchart showing a processing procedure for motor control by a control system according to the present embodiment. FIG. 7 indicates steps, which may be implemented by the control device 100 processor 102 executing a control program (including system program 110 and user program 112 shown in FIG. 2).

Initially, control device 100 causes servo driver 200 to perform tuning and thereby obtains an identifier input and an identifier output, and creates first dynamics model $P_{CM}$ based on the obtained identifier input and output (step S1). Subsequently, control device 100 creates second dynamics model $P_{ML}$ using a waveform parameter (a vibration frequency and an amplitude ratio) obtained from a vibration waveform of controlled object 2 obtained in the tuning (step S2). Instead of steps S1 and S2, a manipulated variable and a measured value of the position of controlled object 2 that are obtained in the tuning may be set as an identifier input and an identifier output, respectively, to create dynamics model P.

Subsequently, control device 100 determines whether controlled object 2 has a position within the measurement target range of measurement sensor 20 (step S3). An example of this determination method is as has been described in the <C. Exemplary Functional Configuration of Control Device> section.

When controlled object 2 has a position outside the measurement target range (NO in step S3), control device 100 generates manipulated variable MV by performing model predictive control in the second mode (step S4). That is, model predictive control is performed using model output value $YL_k$ as controlled variable $PV_k$ for controlled object 2 for the current control period k.

After step S4, control device 100 follows the independent model type to calculate model output value $YL_{k+d+1}$ for control period k+d+1 elapsing since the current control period k by dead time d+1 (step S5). That is, control device 100 calculates model output value $YL_{k+d+1}$ using model output value YL calculated by the previous control period.

When controlled object 2 has a position within the measurement target range (YES in step S3), control device 100 generates manipulated variable MV by performing model predictive control in the first mode (step S6). That is, model predictive control is performed using measured value PVL received from measurement sensor 20 as controlled variable $PV_k$ for controlled object 2 for the current control period k.

After step S6, control device 100 follows the reset model type to calculate model output value $YL_{k+d+1}$ for control period k+d+1 elapsing since the current control period k by dead time d+1 (step S7). That is, control device 100 calculates model output value $YL_{k+d+1}$ using measured value PVL fed back from measurement sensor 20.

Model output value $YL_{k+d+1}$ calculated in step S5 or S7 is used as model output value $YL_{k+d}$ when manipulated variable MV is generated in the subsequent control period.

Subsequently, control device 100 determines whether the end point of the target trajectory is reached (step S8). When the end point of the target trajectory is not reached (NO in step S8), steps S3 to S7 are repeated in the subsequent control period.

When the end point of the target trajectory is reached (YES in step S8), the motor control process ends. Through a processing procedure as above, control device 100 implements motor control according to the present embodiment. Note that steps S1 to S8 are performed for each designated servo driver 200. Accordingly, steps S1 to S8 may be performed for each of the plurality of servo drivers 200 in parallel.

<G. Control in Accordance with Third Mode>

As has been described above, measurement sensor 20 is installed so as to be able to measure a predetermined range (a measurement target range) including the stationary position of controlled object 2. Accordingly, when controlled object 2 is positioned at the stationary position, the position of controlled object 2 normally moves from outside the measurement target range to inside a measurable range. Accordingly, the model predictive control performed in control device 100 is switched from the model predictive control in the second mode to the model predictive control in the first mode. When the model predictive control in the second mode is switched to the model predictive control in the first mode, there is a possibility that manipulated variable MV output to servo driver 200 may rapidly vary and the torque of servomotor 300 may significantly vary. Accordingly, in order to suppress such torque fluctuation, when switching from the model predictive control in the second mode to the model predictive control in the first mode, control device 100 preferably performs control in the following third mode:

The control in the third mode is performed only for N predetermined control periods. N is an integer of 2 or more.

In the third mode, model predictive control module 150 obtains a difference ΔMV between a manipulated variable generated by the model predictive control in the first mode (hereinafter referred to as a "first manipulated variable MV1") and a manipulated variable generated by the model predictive control in the second mode (hereinafter referred to as a "second manipulated variable MV2") (i.e., ΔMV=MV1−MV2).

Model predictive control module 150 generates manipulated variable MV to be output to servo driver 200 so as to eliminate difference ΔMV during the N control periods.

For example, model predictive control module 150 divides difference ΔMV by N(=a divided variable MV/N). In an n-th control period in the third mode, where n is an integer of 1 to N, model predictive control module 150 subtracts divided variable ΔMV/N multiplied by N−n (i.e., (N−n)×ΔMV/N) from first manipulated variable MV1 to generate manipulated variable MV to be output to servo driver 200.

Accordingly, when the model predictive control in the second mode is switched to the model predictive control in the first mode, rapid variation of manipulated variable MV output to servo driver 200 can be suppressed, and variation of torque of servomotor 300 can be suppressed.

<H. Simulation Result>

A simulation was conducted to verify an effect of control device 100 according to the present embodiment.

Figure 8:
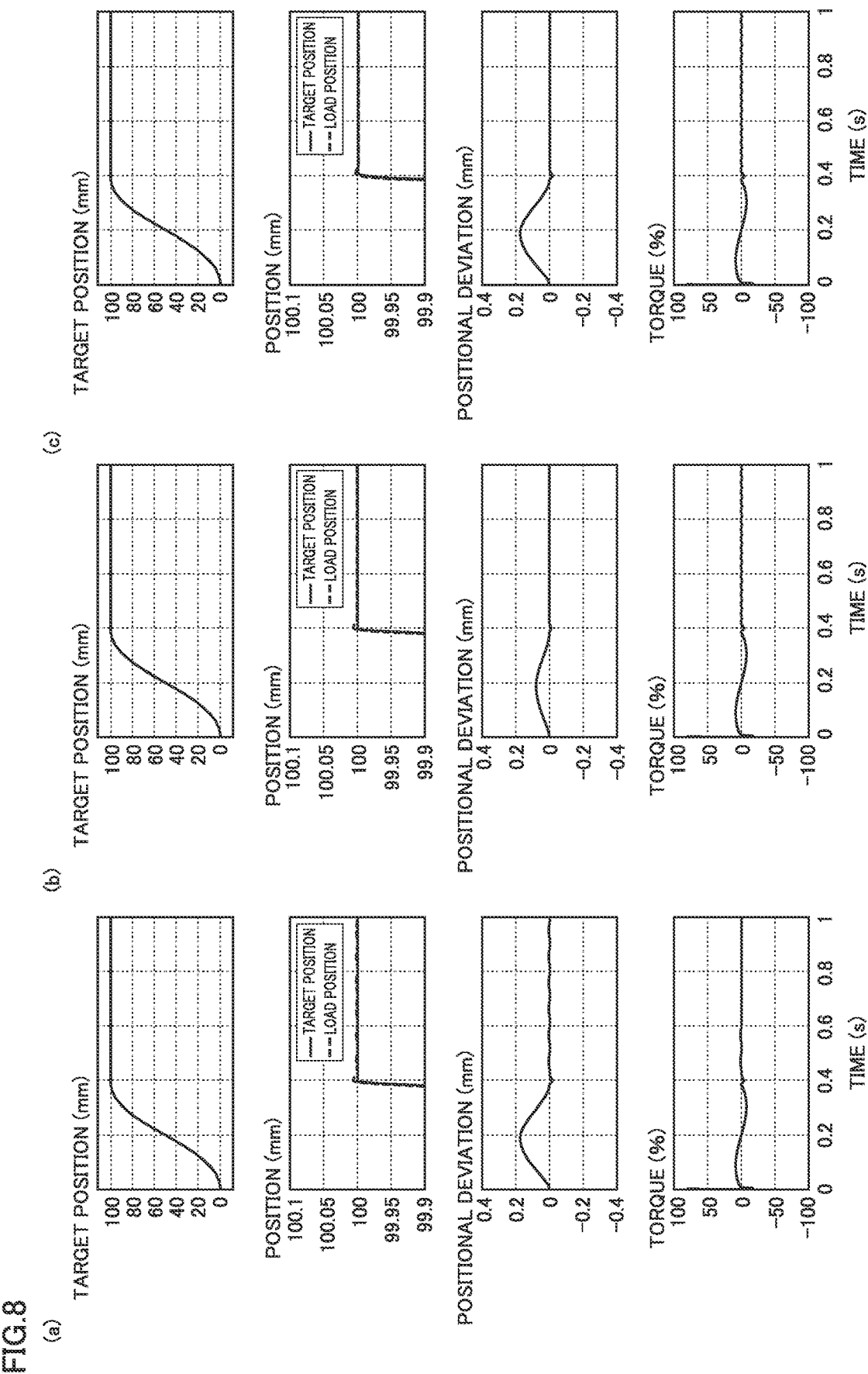
FIG. 8 is a diagram showing an example of a simulation result of the motor control.

FIG. 8 is a diagram showing an example of a simulation result of the motor control. FIG. 8 shows a simulation result under the following conditions.

Second dynamics model $P_{ML}$ with a vibration frequency of 9.2 Hz is used.

The controlled object has an eigenfrequency of 9.2 Hz.

The target trajectory is set such that the controlled object is moved by 100 mm for 400 ms.

A servo driver position control system that is a two-degree-of-freedom model matching control system is used for any simulation with a control parameter having an equal value.

Figure 9:
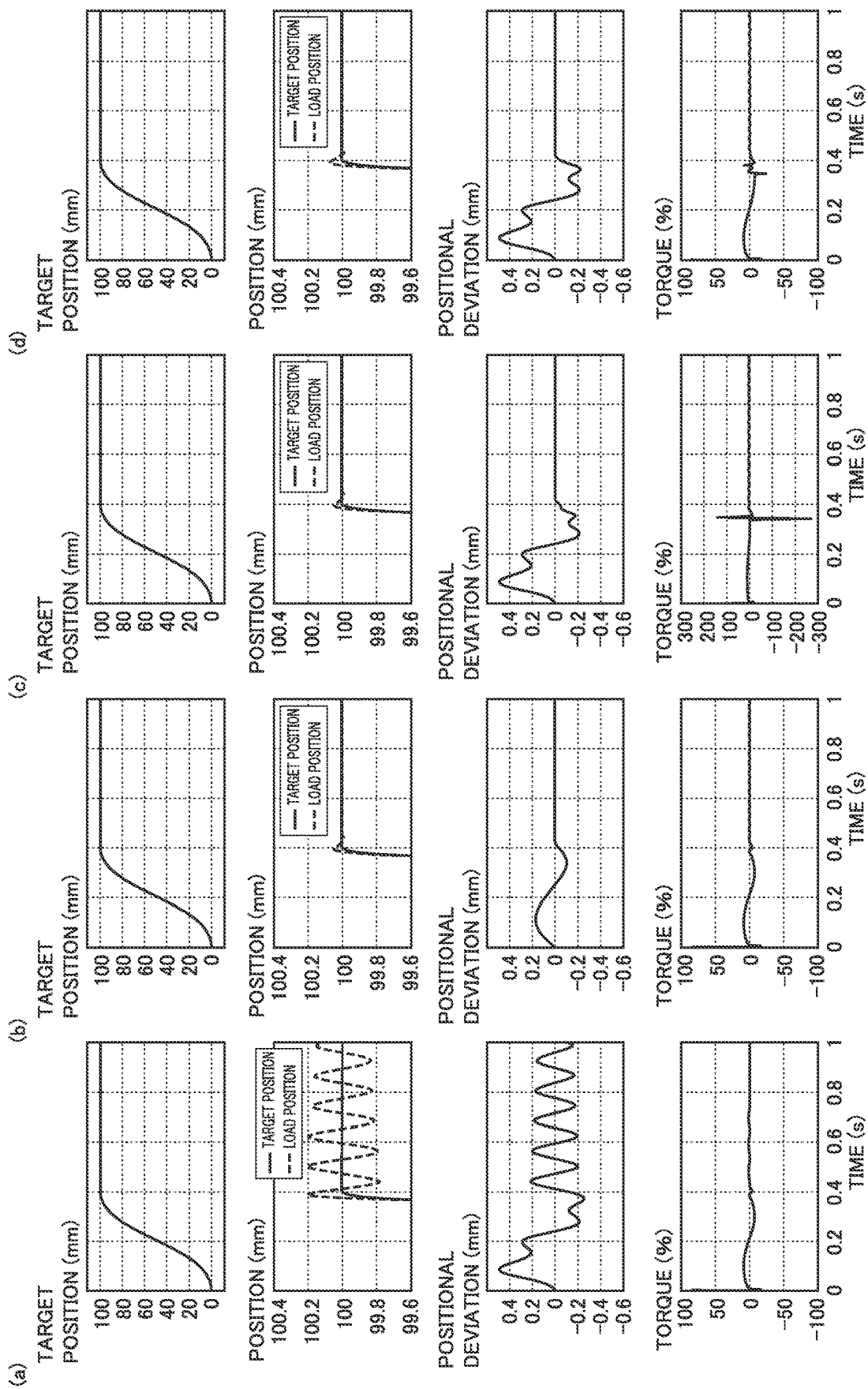
FIG. 9 is a diagram showing another example of a simulation result of the motor control.

FIG. 9 is a diagram showing another example of a simulation result of the motor control. FIG. 9 shows a simulation result under the same conditions as FIG. 8 except that the controlled object had an eigenfrequency changed from 9.2 Hz by −10% to 8.28 Hz.

In FIGS. 8 and 9, a leftmost column (a) shows a simulation result obtained when model predictive control is constantly performed in the second mode without using measured value PVL. In FIGS. 8 and 9, a second column (b) from the left shows a simulation result obtained when model predictive control is constantly performed in the first mode using measured value PVL. In FIGS. 8 and 9, a third column (c) from the left shows a simulation result obtained when the model predictive control in the first mode is performed only for a range of ±2 mm from the stationary position and the model predictive control in the second mode is performed outside the range. In FIG. 9, the rightmost column (d) shows a simulation result obtained when the model predictive control in the first mode is performed only for a range of ±2 mm from the stationary position and the model predictive control in the second mode is performed outside the range, and the control in the third mode is performed when the second mode is switched to the first mode. Note that the control in the third mode was performed for 33 control periods.

In FIGS. 8 and 9, the columns each have a first row representing how a target position varies with time, that is, a target trajectory. The target trajectory is a fifth-order trajectory. The columns each have a second row representing how the target position and the controlled object's position (or the load position) vary with time. The columns each have a third row representing how a deviation between the target position and the load position varies with time. The columns each have a fourth row representing how torque provided to the servomotor varies with time. The graphs in the first to third rows each have a horizontal axis with the same scale as that of the horizontal axis of each graph in the fourth row.

As shown in FIG. 8, when the controlled object vibrates at the same frequency as the vibration frequency in the second dynamics model $P_{ML}$, it has been confirmed that a high vibration damping property is presented whether the first or second mode may be used. While the controlled object is moving (that is, for a period from 0 ms to 400 ms), columns (a) and (c) show the controlled object tracking the target trajectory worse than (b) does. It is believed that this is because a prediction error caused by a model error in the dynamics model cannot be modified by a measured position.

As shown in FIG. 9, when the controlled object vibrates at a frequency varying from the vibration frequency in the second dynamics model $P_{ML}$, it has been confirmed that when model predictive control is performed only in the second mode without using a measured position of the controlled object the controlled object vibrates after it stops (see (a) of FIG. 9). This is because the dynamics model does not accurately model the controlled object.

However, as shown in (b) of FIG. 9, vibration after stop is damped by performing model predictive control in the first mode using a measured position of the controlled object. This is because a difference between the dynamics model and the actual controlled object is modified by a measured position of the controlled object, as appropriate.

As shown in (c) of FIG. 9, even when the model predictive control in the first mode is performed only for a range in a vicinity of the stationary position, vibration after stop is damped similarly as shown in (b) of FIG. 9. From this result, it has been confirmed that using measurement sensor 20 capable of measuring the position of the controlled object in a predetermined range including the stationary position can maintain a high vibration damping property and allow a target trajectory to be kept tracked, and also enhance robustness against variation in the vibration frequency of the controlled object.

Note, however, that (c) of FIG. 9 shows torque significantly varying when the second mode is switched to the first mode. However, as shown in (d) of FIG. 9, it has been confirmed that performing control in the third mode when switching the second mode to the first mode can sufficiently suppress variation in range of torque.

<I. Advantage>

Thus, control device 100 of the present embodiment is connected to a servo mechanism configured to drive controlled object 2, and outputs manipulated variable MV to the servo mechanism so that a controlled variable for controlled object 2 tracks a target trajectory. Control device 100 includes a field bus controller 122 that is an acquisition unit configured to acquire measured value PVL from measurement sensor 20 configured to measure a position of controlled object 2, and processor 102. Processor 102 performs model predictive control using a dynamics model P representing a relationship between manipulated variable MV and the position of controlled object 2 to generate manipulated variable MV to be output to servo driver 200. Measurement sensor 20 can measure the position of controlled object 2 in a predetermined range (a measurement target range) including the stationary position of controlled object 2. When controlled object 2 has a position within the measurement target range, processor 102 performs model predictive control in a first mode using measured value PVL as controlled variable PV for the current control period. When controlled object 2 has a position outside the measurement target range, processor 102 performs model predictive control in a second mode using model output value YL instead of measured value PVL as controlled variable PV for the current control period.

According to the above configuration, regardless of whether controlled object 2 has a position inside or outside the measurement target range, manipulated variable MV is generated through model predictive control. This can better damp vibration and allows the target trajectory to be better tracked.

Further, when controlled object 2 has a position within the measurement target range (that is, in the first mode), model output value YL is calculated using measured value PVL. Thus, even when controlled object 2 has a state varying from the dynamics model, a high vibration damping property can be maintained and robustness against variation in state of controlled object 2 can be increased.

Thus, according to the present embodiment, even when controlled object 2 has its position measured only within a portion of its movability range, it can be positioned while vibration is better damped.

<J. Additional Note>

As described above, the present embodiment and its modified examples include the following disclosure:

(Configuration 1)

A control device (100) connected to a servo mechanism (200, 300) configured to drive a controlled object (2), and configured to output a manipulated variable to the servo mechanism (200, 300) so that a controlled variable for the controlled object (2) tracks a target trajectory, comprising:

an acquisition unit (122) configured to acquire a measured value from a measurement sensor (20) configured to measure a position of the controlled object (2); and a control unit (102, 150) configured to perform model predictive control for each control period using a dynamics model representing a relationship between the manipulated variable and the position of the controlled object (2) to generate the manipulated variable to be output to the servo mechanism (200, 300), the measurement sensor (20) being capable of measuring the position of the controlled object (2) in a predetermined range including a stationary position of the controlled object (2), the control unit (102, 150) being configured to perform model predictive control in a first mode using the measured value as the controlled variable for a current control period when the controlled object (2) has a position within the predetermined range, and perform model predictive control in a second mode using an output value of the dynamics model as the controlled variable for the current control period when the controlled object (2) has a position outside the predetermined range.

(Configuration 2)

The control device according to configuration 1, wherein the control unit (102, 150) in the first mode uses the measured value to calculate the output value of the dynamics model.

(Configuration 3)

The control device (100) according to configuration 2, wherein the control unit (102, 150) in the first mode compensates for the model output value calculated by the current control period by a difference between the measured value in the current control period and the model output value in the current control period.

(Configuration 4)

The control device (100) according to any one of configurations 1 to 3, wherein the control unit (102, 150) performs control in a third mode only for N control periods when the controlled object (2) has a position varying from outside the predetermined range to inside the predetermined range, where N represents an integer of two or more, and the control unit (102, 150) in the third mode generates the manipulated variable to be output to the servo mechanism such that a difference between a first manipulated variable generated by the model predictive control in the first mode and a second manipulated variable generated by the model predictive control in the second mode is eliminated during the N control periods.

(Configuration 5)

The control device (100) according to any one of configurations 1 to 4, wherein the servo mechanism (200, 300) includes a servomotor (300) configured to move the controlled object (2), and a servo driver (200) configured to drive the servomotor (300), the dynamics model includes a first dynamics model representing a relationship between the manipulated variable and a position of the servomotor (300), and a second dynamics model representing a relationship between the position of the servomotor (300) and the position of the controlled object (2), the second dynamics model is generated using a waveform parameter obtained from a vibration waveform of the controlled object (2), and of a vibration frequency and an amplitude ratio of two successive waves in the vibration waveform, the waveform parameter includes at least the vibration frequency.

(Configuration 6)

A control program (110, 112) configured to implement a control device (100) connected to a servo mechanism (200, 300) configured to drive a controlled object (2), and configured to output a manipulated variable to the servo mechanism (200, 300) so that a controlled variable for the controlled object (2) tracks a target trajectory, the control program (110, 112) causing a computer to:

acquire a measured value from a measurement sensor (20) configured to measure a position of the controlled object (2); and perform model predictive control for each control period using a dynamics model representing a relationship between the manipulated variable and the position of the controlled object (2) to generate the manipulated variable to be output to the servo mechanism (200, 300), the measurement sensor (20) being capable of measuring the position of the controlled object (2) in a predetermined range including a stationary position of the controlled object (2), the generating the manipulated variable including performing model predictive control in a first mode using the measured value as the controlled variable for a current control period when the controlled object (2) has a position within the predetermined range, and performing model predictive control in a second mode using an output value of the dynamics model as the controlled variable for the current control period when the controlled object (2) has a position outside the predetermined range.

While the present invention has been described in embodiments, it should be understood that the embodiments disclosed herein are illustrative and non-restrictive in any respect. The scope of the present invention is defined by the terms of the claims, and is intended to include any modifications within the meaning and scope equivalent to the terms of the claims.

REFERENCE SIGNS LIST 1 control system, 2 controlled object, 3 working plate, 4 first base plate, 6, 9 ball screw, 7 second base plate, 20, 20X, 20Y measurement sensor, 100 control device, 101*a*, 101*b* field bus, 102 processor, 104 chip set, 106 main memory, 108 flash memory, 110 system program, 110A model creation library, 110B model predictive control library, 112 user program, 112A sequence program, 112B motion program, 116 external network controller, 118 memory card interface, 120 memory card, 122, 124 field bus controller, 130 model creation module, 140 trajectory generation module, 150 model predictive control module, 160 control unit, 200, 200X, 200Y servo driver, 300, 300X, 300Y servomotor, 400 target to be modelled.

The invention claimed is:

1. A control device connected to a servo mechanism configured to drive a controlled object, and configured to output a manipulated variable to the servo mechanism so that a controlled variable for the controlled object tracks a target trajectory, comprising:

an acquisition unit configured to acquire a measured value from a measurement sensor configured to measure a position of the controlled object; and a control unit configured to perform model predictive control for each control period using a dynamics model representing a relationship between the manipulated variable and the position of the controlled object to generate the manipulated variable to be output to the servo mechanism, the measurement sensor being capable of measuring the position of the controlled object in a predetermined range including a stationary position of the controlled object, the control unit being configured to perform model predictive control in a first mode using the measured value as the controlled variable for a current control period when the controlled object has a position within the predetermined range, and perform model predictive control in a second mode using an output value of the dynamics model as the controlled variable for the current control period when the controlled object has a position outside the predetermined range.

2. The control device according to claim 1, wherein the control unit in the first mode uses the measured value to calculate the output value of the dynamics model.

3. The control device according to claim 2, wherein the control unit in the first mode compensates for an output value of the dynamics model calculated by the current control period by a difference between the measured value in the current control period and the output value of the dynamics model in the current control period.

4. The control device according to claim 1, wherein the control unit performs control in a third mode only for N control periods when the controlled object has a position varying from outside the predetermined range to inside the predetermined range, where N represents an integer of two or more, and the control unit in the third mode generates the manipulated variable to be output to the servo mechanism such that a difference between a first manipulated variable generated by the model predictive control in the first mode and a second manipulated variable generated by the model predictive control in the second mode is eliminated during the N control periods.

5. The control device according to claim 1, wherein the servo mechanism includes a servomotor configured to move the controlled object, and a servo driver configured to drive the servomotor, the dynamics model includes a first dynamics model representing a relationship between the manipulated variable and a position of the servomotor, and a second dynamics model representing a relationship between the position of the servomotor and the position of the controlled object, the second dynamics model is generated using a waveform parameter obtained from a vibration waveform of the controlled object, and of a vibration frequency and an amplitude ratio of two successive waves in the vibration waveform, the waveform parameter includes at least the vibration frequency.

6. A non-transitory computer-readable storage medium storing a control program configured to implement a control device connected to a servo mechanism configured to drive a controlled object, and configured to output a manipulated variable to the servo mechanism so that a controlled variable for the controlled object tracks a target value, the control program causing a computer to perform acquiring a measured value from a measurement sensor configured to measure a position of the controlled object; and performing model predictive control for each control period using a dynamics model representing a relationship between the manipulated variable and the position of the controlled object to generate the manipulated variable to be output to the servo mechanism, the measurement sensor being capable of measuring the position of the controlled object in a predetermined range including a stationary position of the controlled object, the performing model predictive control including performing model predictive control in a first mode using the measured value as the controlled variable for a current control period when the controlled object has a position within the predetermined range, and performing model predictive control in a second mode using an output value of the dynamics model as the controlled variable for the current control period when the controlled object has a position outside the predetermined range.

7. The non-transitory computer-readable storage medium according to claim 6, wherein the control program causing the computer to use the measured value in the first mode to calculate the output value of the dynamics model.

8. The non-transitory computer-readable storage medium according to claim 7, wherein the control program causing the computer to compensate, in the first mode, for an output value of the dynamics model calculated by the current control period by a difference between the measured value in the current control period and the output value of the dynamics model in the current control period.

9. The non-transitory computer-readable storage medium according to claim 6, wherein the control program causing the computer to:

perform control in a third mode only for N control periods when the controlled object has a position varying from outside the predetermined range to inside the predetermined range, where N represents an integer of two or more, and generate, in the third mode, the manipulated variable to be output to the servo mechanism such that a difference between a first manipulated variable generated by the model predictive control in the first mode and a second manipulated variable generated by the model predictive control in the second mode is eliminated during the N control periods.

10. The non-transitory computer-readable storage medium according to claim 6, wherein the servo mechanism includes a servomotor configured to move the controlled object, and a servo driver configured to drive the servomotor, the dynamics model includes a first dynamics model representing a relationship between the manipulated variable and a position of the servomotor, and a second dynamics model representing a relationship between the position of the servomotor and the position of the controlled object, the second dynamics model is generated using a waveform parameter obtained from a vibration waveform of the controlled object, and of a vibration frequency and an amplitude ratio of two successive waves in the vibration waveform, the waveform parameter includes at least the vibration frequency.

* * * * *